(12) United States Patent
Puglisi et al.

(10) Patent No.: US 12,266,027 B2
(45) Date of Patent: Apr. 1, 2025

(54) GUEST-FACING GAME INFORMATION MANAGEMENT SYSTEMS AND METHODS

(71) Applicant: Universal City Studios LLC, Universal City, CA (US)

(72) Inventors: Nicholas Anthony Puglisi, Orlando, FL (US); Keirsten Kupiec, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 101 days.

(21) Appl. No.: 17/707,571

(22) Filed: Mar. 29, 2022

(65) Prior Publication Data

US 2023/0316440 A1    Oct. 5, 2023

(51) Int. Cl.
*G06Q 50/18*    (2012.01)
*G06Q 10/1093*    (2023.01)

(52) U.S. Cl.
CPC ......... *G06Q 50/18* (2013.01); *G06Q 10/1095* (2013.01)

(58) Field of Classification Search
CPC ............................ G06Q 50/18; G06Q 10/1095
See application file for complete search history.

(56) References Cited

U.S. PATENT DOCUMENTS

| | | | |
|---|---|---|---|
| 7,396,281 B2 | 7/2008 | Mendelsohn et al. | |
| 7,852,372 B2 | 12/2010 | Sohmers | |
| 8,287,383 B1 * | 10/2012 | Etter | A63F 13/87 463/42 |
| 8,738,519 B2 | 5/2014 | Blanchard et al. | |
| 9,220,985 B1 * | 12/2015 | Auterio | A63F 13/27 |
| 9,239,993 B2 * | 1/2016 | Bergdale | G06Q 30/0255 |
| 9,881,433 B2 * | 1/2018 | Bergdale | G07C 9/27 |
| 10,580,244 B2 | 3/2020 | Geraghty et al. | |
| 10,762,733 B2 * | 9/2020 | Bergdale | G07C 9/21 |
| 11,556,863 B2 * | 1/2023 | Bergdale | G06F 21/602 |
| 2004/0172316 A1 | 9/2004 | Hale et al. | |

(Continued)

OTHER PUBLICATIONS

Okumura et al, Identity verification using face recognition improved by managing check-in behavior of event attendees. In Advances in Artificial Intelligence: Selected Papers from the Annual Conference of Japanese Society of Artificial Intelligence (JSAI 2019) 33 (pp. 291-304). Springer (Year: 2020).*

(Continued)

*Primary Examiner* — Andre D Boyce
(74) *Attorney, Agent, or Firm* — Fletcher Yoder, P.C.

(57) ABSTRACT

A check-in system includes an amusement park attraction associated with a check-in process. The check-in system also includes a database and a controller. The database stores data indicating availability of the amusement park attraction. The controller receives a request from a guest to attend the amusement park attraction. In response to the request, the controller sends one or more forms, one or more waivers, or both, to the guest. The controller also receives the one or more forms, one or more waivers, or both, after completion. Moreover, the controller verifies the one or more forms, the one or more waivers, or both, to be in compliance for the amusement park attraction. Furthermore, in response to determining compliance, the controller sends an entrance code to the guest, which indicates a verified status.

20 Claims, 5 Drawing Sheets

(56) References Cited

U.S. PATENT DOCUMENTS

| | | | |
|---|---|---|---|
| 2013/0066660 A1* | 3/2013 | Kopitzke | G06Q 10/02 |
| | | | 705/5 |
| 2013/0238392 A1* | 9/2013 | Sloan | G06Q 30/0207 |
| | | | 705/7.29 |
| 2014/0081882 A1* | 3/2014 | Govindaraman | G06Q 50/01 |
| | | | 705/319 |
| 2015/0014412 A1* | 1/2015 | Sulavik | G06Q 10/025 |
| | | | 235/380 |
| 2015/0088775 A1* | 3/2015 | McIntire | G06Q 10/00 |
| | | | 705/325 |
| 2016/0092797 A1 | 3/2016 | Clarke et al. | |
| 2016/0110591 A1* | 4/2016 | Smith | G06V 20/52 |
| | | | 382/103 |
| 2017/0017905 A1* | 1/2017 | Boyer | G06Q 30/0207 |
| 2021/0165862 A1* | 6/2021 | Agrawal | G06F 16/2379 |
| 2021/0319864 A1* | 10/2021 | Wisniewski | G16H 50/80 |

OTHER PUBLICATIONS

PCT/US2023/016587 International Search Report and Written Opinion mailed Jun. 26, 2023.

\* cited by examiner

GUEST-FACING GAME INFORMATION MANAGEMENT SYSTEMS AND METHODS

BACKGROUND

The present disclosure relates generally to the field of amusement parks. Specifically, embodiments of the present disclosure relate to techniques to efficiently check-in guests attending an amusement park experience.

In certain entertainment settings, such as an amusement park, a guest may attend an amusement park experience. For example, the experience may include a special event (e.g., a seasonal event), a ride, a festival, and so forth. Often, the experience may be associated with documents, such as precheck documents, to be completed prior to attending the experience. The precheck documents may include one or more waivers, consent forms, informative forms, and the like. The guest may receive these documents at the experience, such as at the entrance for the experience and then complete the precheck documents prior to attending the experience. In some instances, the precheck documents may be customized based on the particular guest. Moreover, an amusement park personnel may confirm that the precheck documents are properly completed. In some instances, based on the information provided by the guest in the precheck documents, amusement park personnel may take subsequent steps. For example, if the precheck documents indicate that the guest requests assistance to enter and exit the experience, the amusement park personnel may call and task another personnel to accompany the guest. However, completing the precheck process (e.g., guest completing documents, amusement park personnel confirming proper completion of the documents and accommodating guest requests, the guest receiving an indication that the guest has passed the check to attend the experience, and so forth) may be time consuming and use time that may otherwise be spent enjoying the experience.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a check-in system includes an amusement park attraction associated with a check-in process. The check-in system also includes a database and a controller. The database stores data indicating availability of the amusement park attraction. The controller receives a request from a guest to attend the amusement park attraction. In response to the request, the controller sends one or more forms, one or more waivers, or both, to the guest. The controller also receives the one or more forms, one or more waivers, or both, after completion. Moreover, the controller verifies the one or more forms, the one or more waivers, or both, to be in compliance for the amusement park attraction. Furthermore, in response to determining compliance, the controller sends an entrance code to the guest, which indicates a verified status.

In one embodiment, a method of operating a check-in system includes receiving a request to reserve a feature of an attraction. Moreover, the method includes determining availability of one or more features of the attraction as the feature. Additionally, in response to determining that the feature is available, the method includes sending one or more documents to be completed. The method also includes receiving the one or more documents after completion and validating the one or more documents after completion. The method includes providing a code indicating a validated status of the one or more documents after completion. Furthermore, the method includes reserving the feature of the attraction in response to validating the one or more documents after completion.

In one embodiment, another method for operating a check-in system includes sending, via an amusement park application, a request for one or more guests to reserve a feature of an amusement park attraction. The method also includes receiving, via the amusement park application, a request to complete a waiver for each of the one or more guests prior to attending the amusement park attraction. Additionally, the method includes sending, via the amusement park application, the waiver upon completion. Furthermore, the method includes receiving, via the amusement park application, a message to enter the amusement park attraction without a verification process at the amusement park attraction.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
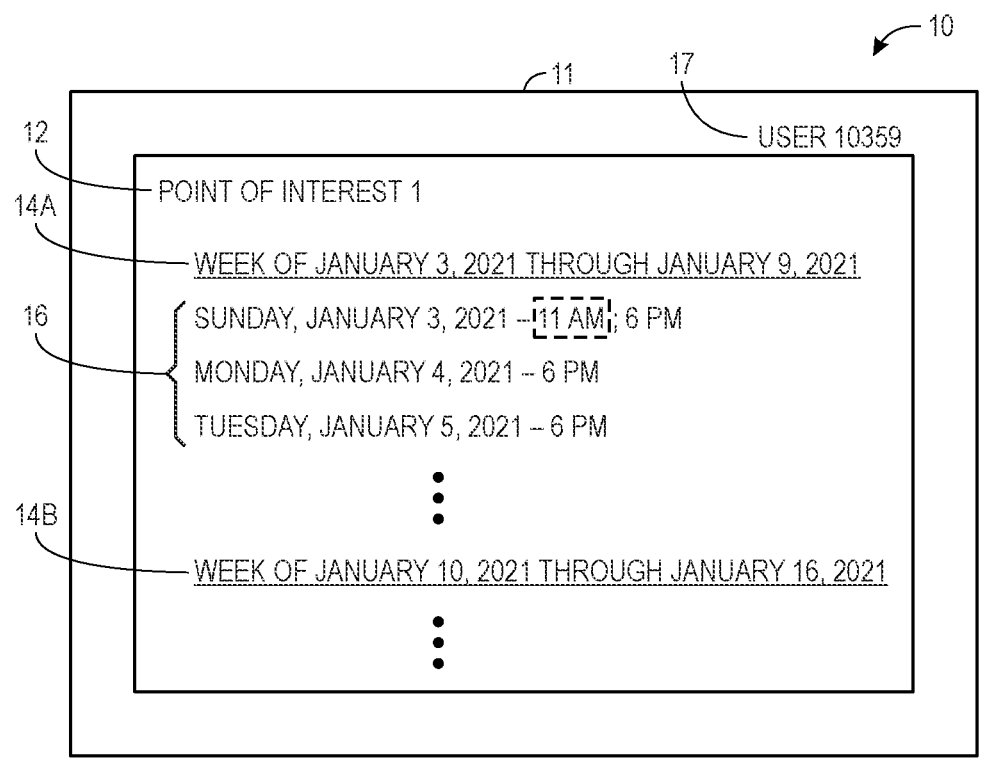
FIG. 1 is a schematic diagram of an amusement park application on a display, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

As used herein, an "amusement park application" may refer to a platform for accessing one or more amusement park applications (e.g., games), tickets, documents, and notifications that are associated with special events, such as a ride, a festival, and so forth. Moreover, as used herein, a "precheck document" or "precheck documents" may refer to any one or more physical or electronic documents associated with an amusement park experience that are to be completed prior to attending the amusement park experience. The precheck documents may include one or more waivers, consent forms, informative forms, and the like. Moreover, the precheck documents may facilitate a precheck process in which a guest or guest party is approved to attend the amusement park experience prior to arriving at the amusement park experience. Additionally, as used herein, a "guest" or "user" may interchangeably refer to a person accessing an entertainment setting, such as the amusement park experience at an amusement park.

As previously discussed, a guest may attend an amusement park experience, such as an event at an amusement park. The amusement park experience may have the guest fill out precheck documents prior to attending the amusement park experience. The documents may include information for efficiently placing the guests and/or other guests in a guest party within the amusement park experience. For example, the amusement park experience may be a holiday parade float and the documents may include questions related to the party size, number of adults and/or children in the party, height of the individuals in the party, any special assistance requests related to loading onto or exiting the float, and so forth. Additionally or alternatively, the documents may include waivers for attending the parade. The documents may be completed and checked for valid completion. Specifically, an amusement park personnel may confirm that the precheck documents are properly completed (e.g., completely filled out, no blank or unreadable fields, and so forth). The amusement park personnel may also confirm that the guest meets the float thresholds, such that the information provided in the documents meets one or more thresholds to ride the float (e.g., age of each guest in the party is above minimum age threshold). Finally, the amusement park personnel may reserve the appropriate float for the guest party (e.g., assign a float that may accommodate the guest based on the information in the documents). Validating and checking in the guest (e.g., making a reservation for the guest upon approval of the documents) manually at the amusement park experience (e.g., at the gate to the ride) may be time consuming. As discussed herein, a check-in system may validate and check in the guest prior to the guest arriving at the amusement park experience for an efficient park experience. That is, the check in system may approve the guest and reserve the amusement park experience for the guest, effectively checking in the guest for the amusement park experience.

It should be noted that although examples provided herein may be specifically directed to particular aspects of a check-in system of an amusement park, such as to facilitate checking in a guest at an amusement park experience at the amusement park, the techniques in this disclosure may be applied to other conditions and/or contexts. Thus, the present examples should be understood to reflect real-world examples of a check-in system and/or an amusement park to provide useful context for the discussion, and should not be viewed as limiting further applicability of the present approach. For example, the present disclosure should be understood as being applicable to additional situations in which validating and/or checking compliance of information prior to an event may be utilized.

With the foregoing in mind, FIG. 1 is a schematic diagram of an amusement park application 10 of an amusement park. The amusement park application 10 may include or provide access to one or more portals (e.g., associated with the amusement park) that may be accessed through a display interface 11, such as a webpage or a mobile application displayed on a device. As will be described in detail herein, the display interface 11 may include visual and/or selectable components (e.g., buttons, editable fields, and so forth) that allow a guest (e.g., a user) to interact with the amusement park application 10. The display interface 11 may display information related to the amusement park, the guest, or both. For example, the amusement park application 10 may include park notifications (e.g., closures, new ride opening dates, wait times for rides, and so forth), tickets purchased, indicators or reminders for special events at the park (e.g., performances, plays, shows, parades, and so forth), listings of games offered for a gaming platform associated with the amusement park, and so forth. As shown, the amusement park application 10 may include one or more points of interest 12, which may include indicators (e.g., names or symbols) that identify areas associated with the amusement park (e.g., physical amusement park experiences at the park or virtual experiences within a game) and accessible by the guest. Although the following discussions describe the point of interest 12 as referencing a parade (e.g., a special event), the point of interest 12 may reference any areas accessible by the guest, such as but not limited to attractions, rides, restaurants, events, restrooms, games, and so forth. It should be noted that the point of interest 12, as used herein, may refer to an indicator for an area or an area itself, depending on context.

By way of example, in FIG. 1, a selected point of interest 12 (point of interest 1) references a holiday parade. The amusement park application 10 displays information related to the point of interest 12, such as location, duration, description, reservation options, and so forth, related to the actual event corresponding to the point of interest 12. Here, for the holiday parade as the point of interest 12, the amusement park application 10 may include information, such as one or more event durations 14 (e.g., weeks of holiday months), one or more reservation timings 16 (e.g., one or more available time slots on one or more dates of the week), and any other parade-related information (as indicated by the ellipses). The amusement park application 10 includes a first duration 14A (week of Jan. 3, 2021 through Jan. 9, 2021) and a second duration 14B (week of Jan. 10, 2021 through Jan. 16, 2021) as the duration of the holiday parade. In the depicted embodiment, the guest is interested in attending the parade during the first duration 14A. The first duration 14A includes four reservation timings 16 available for reservation to attend the parade (e.g., 11 AM and 6 PM on Sunday, January $3^{rd}$, 6 PM on Monday, January 4, and 6 PM on Tuesday, January 5). However, each of the durations 14 may include one or more reservation timings 16. In some embodiments, the amusement park application 10 may update in real time, such that if a previously unavailable reservation becomes available upon cancellation, the corresponding reservation timing 16 is shown as available for reservation. In the depicted embodiment, as shown by the dash line box, the user selects the reservation timing 16 of Sunday, Jan. 3, 2021 at 11 AM.

In some embodiments, the amusement park application 10 may include an account associated with the guest, such that the guest has a unique user identification (ID) 17 and associated guest data. In the illustrated embodiment, the user ID 17 is presented on the display interface 11. The user ID 17 (e.g., 10359) may include a unique combination of letters, numbers, and/or characters that identifies a guest profile associated with the guest. The guest may select the user ID 17 and/or the amusement park application 10 may assign the user ID 17 so long as the user ID 17 is available (e.g., not presently used by another guest). The amusement park application 10 (e.g., via the check-in system) may store guest data (e.g., in one or more databases) and tag it with the user ID 17, such that the amusement park application 10 and/or the amusement park may retrieve the guest data using the unique user ID 17. By way of example, the guest data may include an email address, a guest name or a screen-name, age, height, family members and respective age and height, languages spoken, preferred language, and so forth. The guest data may also include tracked guest activity associated with or within the amusement park, such as annual passes associated with the guest, duration of park visit, rides accessed, zones accessed, activity on a game portal associated with the amusement park, etc. By way of example, an annual pass may be unique to the guest and as such, an annual pass ID may be used as the user ID 17 to retrieve guest data for the annual pass holder.

Moreover, in some instances, the amusement park application 10 may also pull data from third-party applications associated with the guest (e.g., medical information indicating assistance will likely be requested for rides) and tag it with the user ID 17 prior to storing it as guest data. In particular, and as will be described in detail with respect to FIG. 4, the check-in system may communicate with third-party applications programming interfaces (APIs) that allow the check-in system to communicate with the third-party applications. Specifically, the APIs may function as intermediaries that send a request from the amusement park application 10 to the third-party applications (e.g., third-party systems), receive the information back from the third-party applications, and deliver the information back to the check-in system. In this manner, the check-in system may access third-party information that may not be available otherwise through the check-in system. By way of example, the check-in system via the amusement park application 10 on a mobile device may access third-party applications on the mobile device, such as social media applications, medical applications, bank applications, and so forth, upon the guest granting access. The check-in system may use such information to learn about the guest. The third-party data may indicate preferences including, but not limited to, favorite float on the holiday parade (e.g., as indicated on social media), size of family, medical conditions, physical disabilities, and/or information related to family members of the guest. In some embodiments, the check-in system may retrieve the guest data using the user ID 17 and use the guest data to precheck the guest, provide appropriate precheck documents, automatically populate portions of the precheck document for review by the guest, and/or validate the guest for the point of interest 12 (e.g., the parade). In this manner, the check-in system may use the guest data to efficiently verify and check in the guest for a reservation prior to guest arrival at the point of interest 12.

Figure 2:
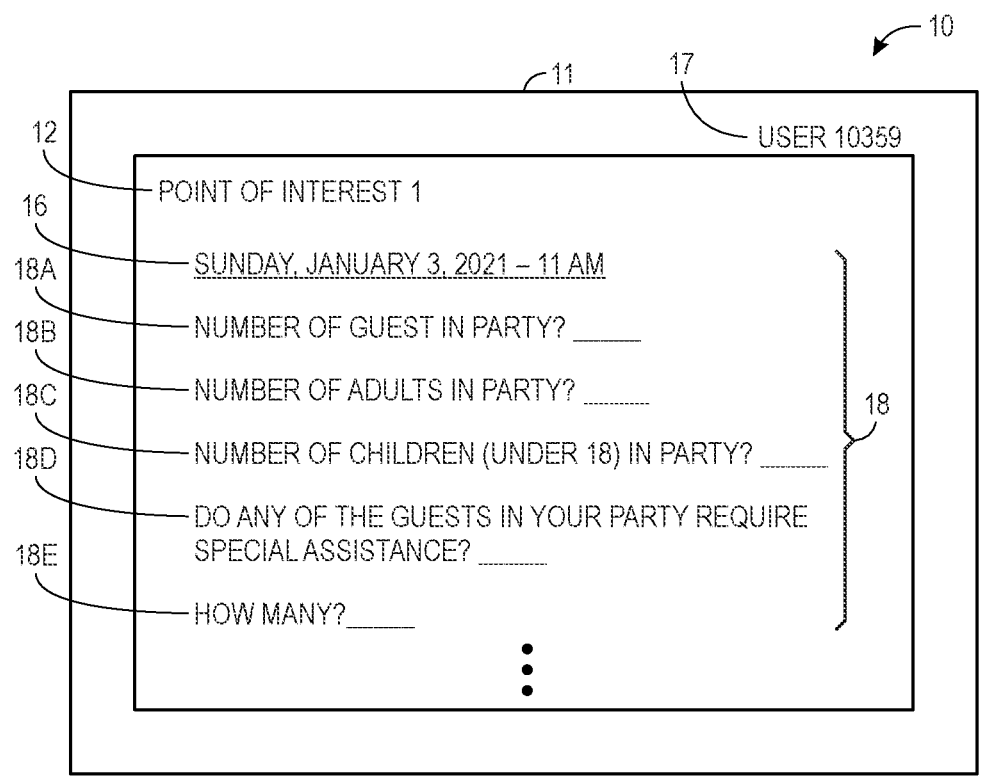
FIG. 2 is a schematic diagram of questions in a form that are displayed based on a selection of an amusement park experience in the amusement park application of FIG. 1, in accordance with an embodiment of the present disclosure.

FIG. 2 illustrates a schematic diagram of questions of a form that is presented based on a selection of an amusement park experience (e.g., point of interest 12) in the amusement park application of FIG. 1. Specifically, as previously mentioned, the guest selects the reservation timing 16 of 11 AM on Sunday, Jan. 3, 2021 for the parade. As previously mentioned, the amusement park application 10 includes input fields, selectable buttons, and so forth, to facilitate receiving input from the guest. Upon selection of the reservation timing 16, one or more sub-questions 18 related to the point of interest 12 may appear. Here, the sub-questions 18 include a first sub-question 18A requesting the number of guests in the party. The guest may enter the number of guests (e.g., one, two, four, and so forth) that will ride the float in the parade. A second sub-question 18B requests the number of adults (e.g., age 18+) in the party and a third sub-question 18C requests the number of children (e.g., under age 18) in the party. The second sub-question 18B and the third sub-question 18C are sub-questions of the first sub-question 18A. In some embodiments, sub-questions 18 stemming from a previous question may be presented in the amusement park application 10 upon an answer to the previous question (e.g., triggers subsequent question to appear). Additionally or alternatively, the sub-questions 18 may be removed from display based on the answer to the previous question. As such, the sub-questions 18 may be dynamic, such that they appear or disappear based on a previous answer. Moreover, the subsequent sub-questions 18 may be tailored to the answer provided for the previous sub-question 18.

The sub-questions 18 also include a fourth sub-question 18D requesting if any guests in the party require special assistance, such as to accommodate a condition (e.g., a need for wheelchair access or a need for language translation), and so forth. A fifth sub-question 18E, which is a sub-question of the fourth sub-question 18D, may request an indication of how many guests require special assistance. As previously discussed, the fifth sub-question 18E may appear based on the particular response to the previous sub-question that triggers the fifth sub-question 18E. For example, if the guest answered "yes" to the fourth sub-question 18D, the check-in system may cause the fifth sub-question 18E to appear. Alternatively, if the guest answered "no" to the fourth sub-question 18D, the check-in system may indicate that the information requested in the present form has been completed, cause a different sub-question 18 to appear, and/or remove the fifth sub-question 18E. As previously discussed, the user ID 17 may be used to prepopulate editable answers to the sub-questions 18, as well as tailor questions associated with the user ID 17. For example, if the guest data associated with the user ID 17 indicates that the guest purchased an adult ticket and a child ticket to the parade, the check-in system may request information related to both an adult and child, as well as prepopulate the answer fields based on the ticket purchase and other guest data. In some embodiments, information requested for the point of interest 12 may be static for each guest (e.g., same form), for example, based on protocols for the particular point of interest (e.g., questions to answer for ride protocols of a ride of interest).

Figure 3:
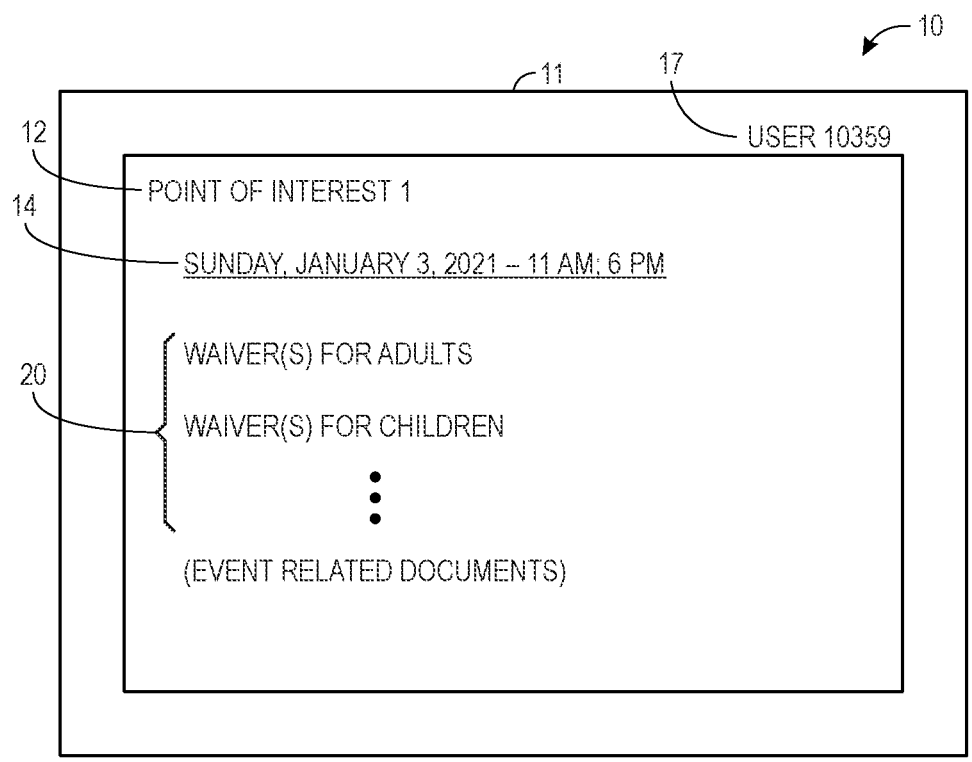
FIG. 3 is a schematic diagram of waivers that are displayed based on selection of the amusement park experience and the information provided for the questions of FIG. 2, in accordance with an embodiment of the present disclosure.

FIG. 3 is a schematic diagram of waivers that are presented based on selection of the amusement park experience (e.g., point of interest 12) of FIG. 1, the information provided for the questions of FIG. 2, or both. That is, upon selection of the parade as the point of interest 12, the amusement park application 10 may provide the guest with waivers 20 to attend the parade. Additionally or alternatively, the waivers 20 provided may be based on the information provided for the sub-questions 18. As shown, the waivers 20 include waivers for the adults in the party, waivers for the children in the party, and any other event-related documents (as indicated by the ellipses). Thus, the amusement park application 10 may request information via forms or the like, request completion of waivers, and so forth, prior to the guest and party arriving at the parade. In some embodiments, if the waivers 20 are improperly completed (e.g., missing guest initials on each page, digital signature is illegible, and so forth), the amusement park application 10 may prompt the user to correct the identified issue while validating the precheck documents (e.g., forms with the sub-questions 18, the waivers 20, and other event related documents). As will be discussed in detail with respect to FIG. 5 and FIG. 6, the guest may receive an indication that the check-in process has been completed and that the party is approved for the point of interest 12. In this manner, the amusement park application 10 may provide an interface for pre-checking (e.g., guest facing check-in process), as well as for validating (e.g., non-guest facing check-in process), for the point of interest 12 prior to the guest arriving at the point of interest 12. The precheck process of requesting information via the precheck documents, validating the guest, and providing the indication of approval prior to arrival provides an efficient process for attending the ride. Moreover, prechecking may remove any bottlenecks in the guest line that may otherwise occur due to passing out forms, requesting information via the forms, requesting signatures on waivers 20, checking compliance for the forms and waivers, verifying proper completion, approving or disapproving the guest, reserving the time slot for the point of interest 12, and so forth.

Figure 4:
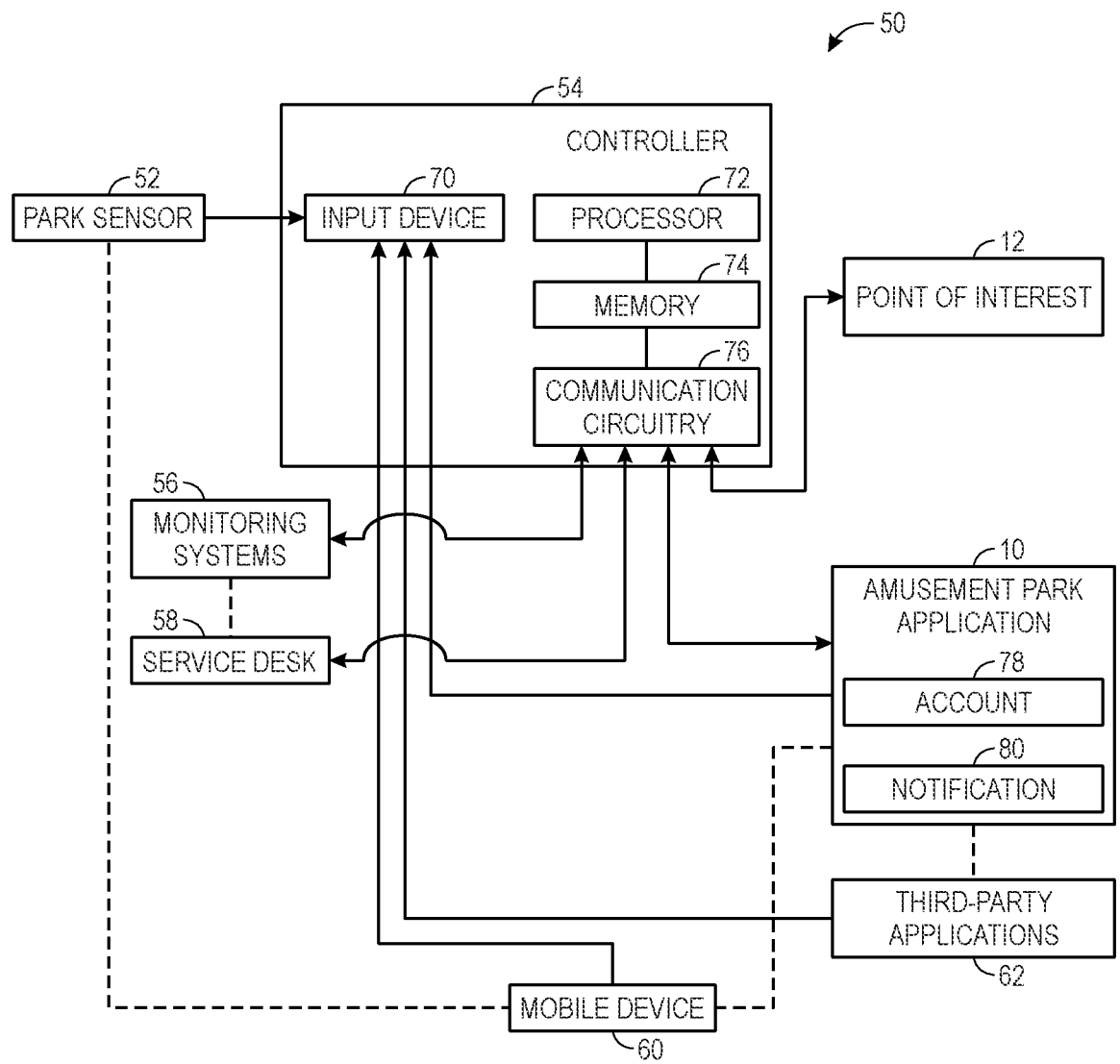
FIG. 4 is a block diagram of a check-in system for checking in a guest for an amusement park experience, in accordance with an embodiment of the present disclosure.

To illustrate the system interfacing with the guest via the amusement park application and validating the guest, FIG. 4 depicts a check-in system 50 for checking in the guest prior to guest arrival at the point of interest 12. As shown, the check-in system 50 includes park sensors 52, a controller 54, a point of interest 12, an amusement park application 10, a guest mobile device 60, and third-party applications 62. In some embodiments, the check-in system 50 may also include a monitoring system 56, a service desk 58, or both. It should be understood that the illustrated system is merely intended to be exemplary, and that certain features and components may be omitted and various other features and components may be added to facilitate performance, in accordance with the disclosed embodiments.

The controller 54 may include an input device 70, a processor 72, a memory 74, and a communication circuitry 76. The input device 70 may receive input data from the park sensors 52, the amusement park application 10, the third-party applications 62, and the guest mobile device 60. Although the following discussions describe the amusement park application 10, the third-party applications 62, and the guest mobile device 60 as separate components of the check-in system 50 that provide data to the input device 70, these components may instead be integrated into or communicate with (as indicated by the dash-dot lines) the amusement park application 10. Based on the input data received at the input device 70, the controller 54 may check in and validate a guest to attend the point of interest 12, as previously discussed.

The controller 54 may check in the guest and/or confirm compliance with procedures for the point of interest 12 based on the information provided for checking in (e.g., approve or validate the guest). As previously discussed, the point of interest 12 may include attractions throughout the amusement park, such as rides, virtual game rooms, picnic areas, restaurants, special events, such as parades or shows, and so forth. In some instances, the guest may complete precheck documents at the point of interest 12 to attend the point of interest 12, as previously discussed. Completing such documents after arriving at the point of interest 12 may be time consuming and cause delay to attend the point of interest (e.g., get on the float of the parade). As such, the controller 54 may communicate with the point of interest 12 (e.g., another system and/or park personnel) and the amusement park application 10 to precheck the guest prior to arrival at the point of interest 12.

The amusement park application 10 may include an account application 78 and a notification application 80. The account application may include the user ID 17, as well as any information related to the user ID 17 for the guest. In some embodiments, and as previously discussed, guest data may be associated with the particular user ID 17 so that the precheck documents may be tailored and/or prepopulated for confirmation based on the guest data. The notification application 80 may provide messages to the guest. The messages may include communication related to the amusement park, such as information related to points of interest 12. The notification application 80 may inform the guest of precheck documents to be completed prior to arrival at the point of interest 12. In some embodiments, the notification application 80 may also message the guest suggesting a possible point of interest 12 based on location of the guest (e.g., based on location of the guest executing the amusement park application 10). Moreover, the notification application 80 may notify the guest that the guest has been approved to attend the point of interest 12 (e.g., precheck documents have been verified). As will be discussed herein, the amusement park application 10 may provide a Quick Response (QR) code to enter the amusement park application 10, in which the QR code indicates that the guest has been checked in and approved for the reservation to attend the point of interest 12. The guest may receive the QR code via the amusement park application 10, email, text message, and so forth.

In some embodiments, the controller 54 may initiate the check-in process based on data from the park sensors 52. Specifically, the park sensors 52 may indicate a selection or intention to attend the point of interest 12. The park sensors 52 may include inputs within the amusement park application 10, as well as physical sensors at the amusement park. For example, the park sensors 52 may include touch sensors of the mobile device 60 that indicate selection of the point of interest 12 and the reservation timing 16. The park sensors 52 may include one or more radio frequency identification (RFID) tags, one or more cameras, one or more weight sensors, one or more electronic readers, and/or one or more proximity sensors. The park sensors 52 may be placed or positioned in areas where guest presence is expected, such as near the point of interest 12. For example, park sensors 52 positioned in a guest line for a point of interest 12 may detect a guest and determine that the guest is likely to attend the point of interest 12 including the line. The RFID tags may communicate with the electronic readers to indicate a presence of the guest. Thus, the electronic readers may be placed in a manner that allows scanning of the RFID tag, such as along a particular path leading up to the point of interest 12. In some embodiments, the RFID tags may include guest-wearable RFID tags that are associated with particular user IDs 17. Thus, the input data from an electronic reader may indicate that a guest associated with a user ID 17 is present upon scanning the guest wearable RFID tag. Subsequently, the controller 54 may retrieve the guest data based on the user ID 17 for populating forms provided to the guest for attending the point of interest 12. In some embodiments, the amusement park application 10 may communicate with the park sensors 52, such that the guest detected near a particular point of interest 12 (e.g., within a threshold distance from the point of interest 12) receives a prompt suggesting interest in the nearby point of interest 12 and/or for performing the check-in process prior to arrival at the point of interest 12.

The third-party applications 62 may provide input data to the input device 70. That is, upon guest permission, the third-party applications 62 may be enabled to share data with the check-in system 50. The third-party applications 62 may include systems associated with third-parties, which include entities that do not have a direct relationship with the amusement park. The third-party applications 62 may provide third-party data from one or more third-parties, collected through their websites, mobile applications, and/or other platforms. As previously mentioned, the third-party applications 62 may include, but are not limited to, social media applications, medical applications, and/or bank applications. Thus, third-party data from the third-party applications 62 may include data associated with the social media applications, medical applications, and/or bank applications.

The guest mobile device 60 may also provide input data to the input device 70. Upon permission from the guest, the guest mobile device 60 may be enabled to share device data with the check-in system 50. The device data may include, but is not limited to, images and videos stored on or accessible to the guest mobile device 60 (e.g., image of the parade or other point of interest), a GPS location of the guest mobile device 60 (e.g., indicating guest is walking to or within a threshold distance from a point of interest 12 and thus, likely interested in attending the point of interest 12), tracking data determined by the guest mobile device 60, and/or setting preferences (e.g., special accessibility features enabled, etc.).

The check-in system 50 includes a monitoring system 56 and a service desk 58. Although the following discussions describe the monitoring system 56 and service desk 58 as separate components of the check-in system 50, these components may communicate with each other (e.g., as indicated by the dash-dot line) or be integrated into a single system (e.g., the service desk 58 is part of the monitoring system 56). The monitoring system 56 may be an administrative system that monitors the park sensors 52, the point of interest 12, and the amusement park application 10. For example, the monitoring system 56 may monitor data used for the check-in process and validating guests, control signals to control features of the point of interest, such as the floats, and so forth. In particular, the monitoring system 56 may ensure that the park sensors 52, the point of interest 12, and the amusement park application 10 function as expected. In some embodiments, the monitoring system 56 may also track wait times or queues for the rides to maintain an expected throughput while performing the precheck process.

Additionally, if the controller 54 is not functioning as expected (e.g., erroneous control signals), the monitoring system 56 may control or reconfigure the controller 54. In this manner, the monitoring system 56 may reset or recalibrate the park sensors 52, the point of interest 12, and the amusement park application 10, and/or override a display or organization of the precheck documents on the amusement park application 10 for the particular guest (as originally determined by the controller 54). The monitoring system 56 may reset algorithms related to the precheck documents. In certain embodiments, the monitoring system 56 and the controller 54 may be implemented as a single controller.

In some embodiments, the service desk 58, which may include human or virtual service agents, may manually stop features of the point of interest 12 via a stopping mechanism (e.g., button) to override control signals from the controller 54 if the service desk 58 finds any issues with the point of interest 12. Since the guest may be tracked, as previously discussed (e.g., via guest-wearable RFID tags), the service desk 58 may monitor activity of the guest and use it to address unexpected delays or unexpected functions at the amusement park. By way of example, the tracked activity may indicate that the guest will not be able to attend the parade at the reserved reservation timing 16, indicating to the controller 54 that the float may be reassigned upon confirmation from the delayed guest.

The controller 54 may enable the communication circuitry 76 to interface with various electronic devices, such as the monitoring system 56, the service desk 58, the amusement park application 10, and/or the point of interest 12. The monitoring system 56 and/or the service desk 58 may communicate with the controller 54 to receive and/or send information (as indicated by double-headed arrow) to ensure that the amusement park application 10 and/or the point of interest 12 are operating as expected. Additionally, or alternatively, the controller 54 may enable the communication circuitry 76 to interface with components of the point of interest 12. For example, the communication circuitry 76 may allow the controller 54 to communicatively couple to a network, such as a personal area network (PAN), a local area network (LAN), and/or a wide area network (WAN). Accordingly, in some embodiments, the controller 54 may process data from the input device 70, determine a point of interest 12, determine guest data associated with the guest from the respective user ID 17, determine precheck documents to provide to the guest, prepopulate portions of the precheck documents, communicate the documents to the amusement park application 10, receive inputs from the amusement park application 10, approve the guest to attend the point of interest 12, and so forth, via the communication circuitry 76. For example, after processing sensor data from the input device 70, the processor 72 may determine a control signal that enables the communication circuitry 76 to wirelessly transmit control data to the amusement park application 10 and/or the point of interest 12 to facilitate guiding the guest to attend the point of interest 12. In other embodiments, the communication circuitry 76 may be connected via a wired connection to the amusement park application 10 and/or the point of interest 12.

The processor 72 may include one or more processing devices that receive input signals from the input device 70 relating to the guest data, which may then be used to check in and validate the guest before the reservation for the point of interest 12, using techniques described herein. The memory 74 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired algorithms (e.g., program code) in the form of machine-executable instructions or data structures and which can be accessed by the processor 72 or by other processor-based devices. In particular, the processor 72 may include a processing core to execute machine-executable instruction algorithms stored in the memory 74. The processor 72 may also include processor-side interfaces for software applications running on the processing core to interact with hardware components of the point of interest 12 associated with the processor 72, such as hard components of the float or other features of the parade. The memory 74 may store guest data and algorithms for validating the guest for the particular point of interest 12, providing a confirmation of the validation to proceed with attending the point of interest 12, and so forth. The memory 74 may tag guest data with the corresponding user ID 17 prior to storing it for subsequent retrieval. That is, the check-in system 50 may retrieve data associated with the guest by looking up the user ID 17 and using the associated guest data. By way of example in the amusement park setting, the stored algorithms may include, but are not limited to, algorithms to determine the guest presence based on sensor data from the park sensors 52, identify the particular guest, identify a point of interest 12, retrieve guest data for the user ID 17 if available, determine the appropriate precheck documents (e.g., forms, waivers, and so forth) to provide for the point of interest 12, determine portions and/or populate portions of the precheck documents based on the guest data, and so forth.

Figure 5:
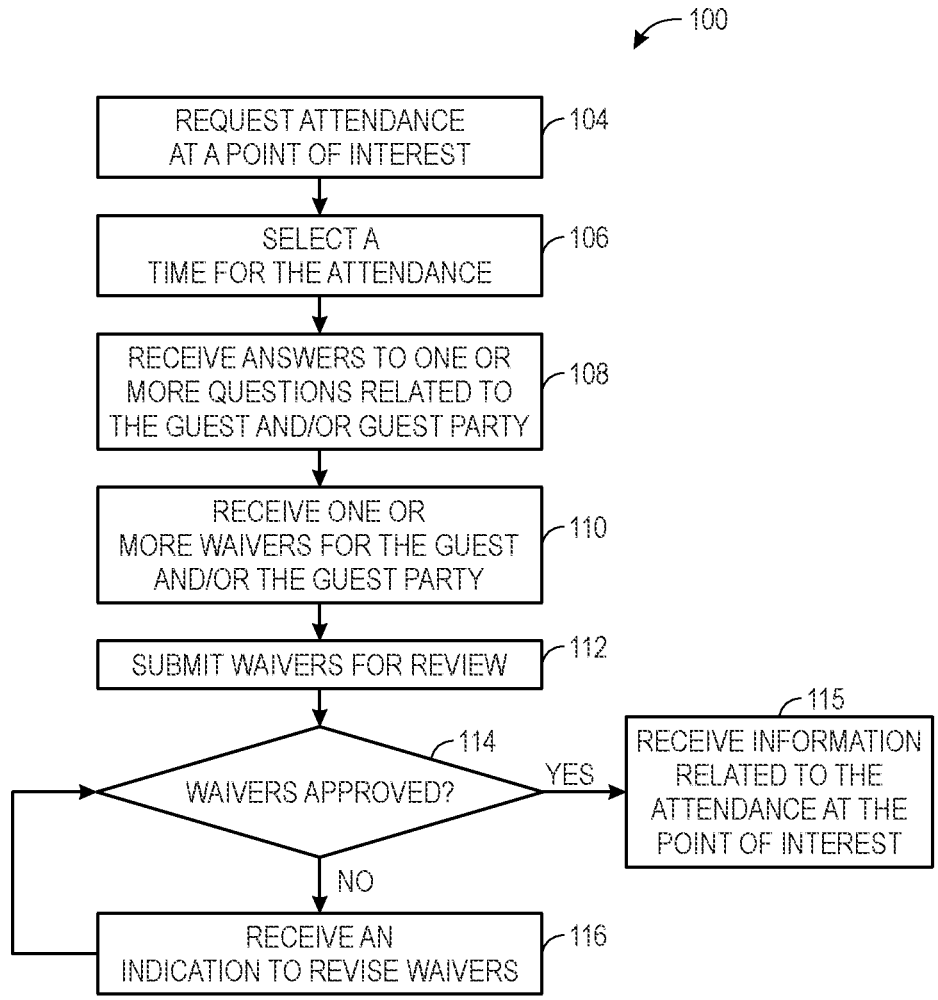
FIG. 5 is a process flow diagram for a guest-facing check-in process, in accordance with an embodiment of the present disclosure.
Figure 6:
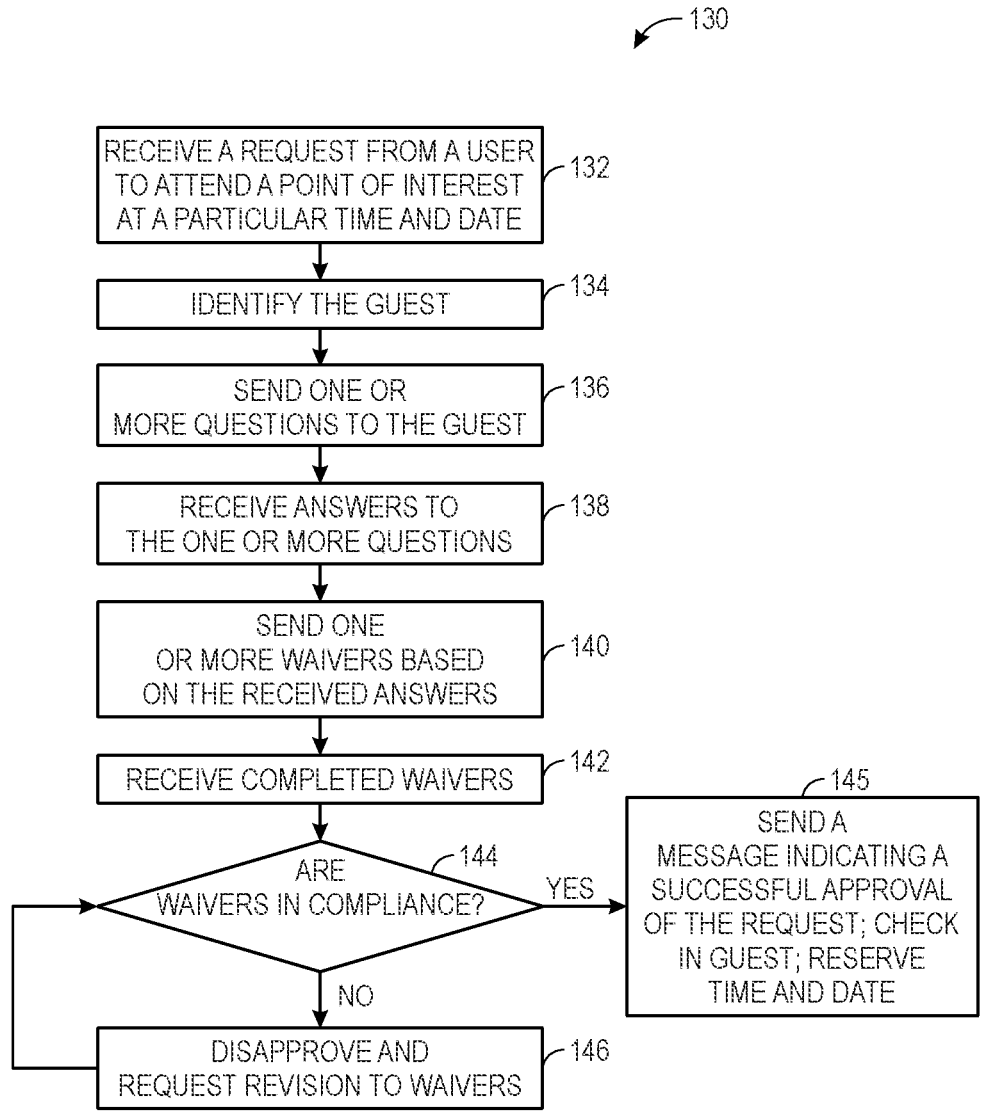
FIG. 6 is a process flow diagram for a non-guest facing check-in process, in accordance with an embodiment of the present disclosure.

FIG. 5 is a flow diagram of a method 100 for a guest undergoing a check-in process on the amusement park application 10. That is, method 100 includes the guest-facing interface and check-in process of the check-in system 50. While the method 100 of FIG. 5 and the method 130 of FIG. 6 are described using acts in a specific sequence, it should be understood that the described acts may be performed in different sequences than the sequence illustrated, and certain described acts may be skipped or not performed altogether. In general, at least some of the steps of the method 100 and the method 130 may be implemented at least in part by the check-in system 50 of FIG. 4. Specifically, these steps may be implemented at least in part by the controller 54 and/or the processor 72 of the controller 54 that executes instructions stored in a tangible, non-transitory, computer-readable medium, such as the memory 74. In alternative or additional embodiments, at least some steps of the method 100 and the method 130 may be implemented by any other suitable components or control logic, and the like.

As previously discussed, a guest may be interested in attending a point of interest 12 (e.g., an amusement park attraction). Accordingly, the processor 72 may request (process block 104) attendance at a point of interest 12 based on input received (e.g., guest selects point of interest 12) in the amusement park application 10 executing on an electronic device associated with the guest (e.g., guest device, mobile device 60). As previously mentioned, the point of interest 12 may include a ride, a special event, such as a parade or a show, and so forth. The processor 72 may select (process block 106) a time for attendance at a point of interest 12 based on input received (e.g., guest selects reservation timing 16) in the amusement park application 10. That is, the guest may view various time slots on one or more days for the point of interest 12, as discussed with respect to FIG. 2, and based on a selection from the guest, the processor 72 may select the time to reserve for the guest. The selection may cause the amusement park application 10 to display one or more questions (e.g., sub-questions 18) related to the guest and/or guest party, as discussed with respect to FIG. 2. The processor 72 may receive (process block 108) answers to one or more questions related to the guest and/or guest party based on input received (e.g., guest inputs information for sub-questions 18) in the amusement park application 10. That is, the guest may input (e.g., select, type in, and so forth) answers to the one or more general or point of interest-related questions for the selected time and the processor 72 may process the answers.

Additionally or alternatively, the processor 72 may receive (process block 110) one or waivers 20 to display on the amusement park application 10 for the guest and/or the guest party to receive on the display. In particular, the processor 72 may retrieve or receive general, particular, or both, waivers 20 to subsequently provide to the guest and/or guest party in the amusement park application 10. As such, as discussed with respect to FIG. 3, the amusement park application 10 may request information via precheck documents including forms or the like (e.g., the one or more questions), request completion of waivers 20, and so forth, prior to the guest arriving at the point of interest 12.

The processor 72 may submit (process block 112) the waivers 20 for review after the waivers are indicated as completed based on guest input received (e.g., guest submits the completed waivers 20). In particular, the guest may receive the waivers 20 in the amusement park application 10, complete the waivers 20, and submit the waivers 20 for review as part of the check-in process. The guest may receive an indication via the processor 72 as to whether (decision block 114) the waivers 20 were approved. Specifically, the guest may receive an indication of whether the guest was approved or verified to attend the point of interest 12 for the guest and/or guest party. The processor 72 may provide the indication based on the inputted information from the waivers 20.

If the waivers 20 are approved, the processor 72 may receive (process block 115) information related to the attendance at the point of interest 12 to correspondingly display in the amusement park application 10 for the guest to receive the information. That is, the guest may receive a notice (e.g., a message) indicating that the waivers 20 were accepted along with a QR code that may be verified or scanned for entrance to attend the point of interest 12. The QR code may indicate that the guest and/or the guest party has been verified to attend the point of interest 12. However, if the waivers 20 are not approved, the processor 72 may receive (processor block 116) an indication to revise the waivers 20 and display the indication on the amusement park application 10 for the guest to receive. Specifically, the processor 72 may provide (e.g., the guest may receive) an indication that the waivers 20 were not accepted, the reasons for not accepting the waivers 20, recommendation to revise the waivers 20 (e.g., indication of the field that needs to be revised within the waiver 20), any other reason related to the failed or unapproved check-in, and so forth. As such, the processor 72 may update the waivers 20 based on the revised or new information inputted by the guest in the amusement park application 10.

FIG. 6 is a flow diagram of a method 130 for a non-guest facing check-in process. That is, the method 130 includes the backside verification of the guest based on input received at the guest-facing interface, as discussed with respect to FIG.

5. On the backside of the verification process for checking in the guest, the processor 72 may receive (process block 132) a request from a guest to attend a point of interest 12, such as the parade at the particular time and place. The processor 72 may receive the input and perform point of interest-related checks, such as determining whether the point of interest 12 is available at the selected time. With respect to the parade, the processor 72 may determine whether a float is available at the selected time for the particular guest. Specifically, the processor 72 may reference a database storing the number of floats in the parade and present reservations to determine availability of a suitable float. The database may generally store any information related to the features available for reservation for a point of interest 12. With respect to the floats, the database may store the type of floats (e.g., 2-seater, 4-seater, and so forth), the time that the floats are reserved or available each day, special assistance features in the floats, and so forth. In some instances, the availability may change based on answers provided to questions and/or information provided in the waivers 20. That is, the particular floats reserved for the guest at the particular available time slot may change based on new information, such as the number of guests in the party to attend the parade with the guest, special assistance, and so forth.

In some embodiments, the processor 72 may identify (process block 134) the guest. In particular, and as discussed with respect to FIG. 1, the processor 72 may use the user ID 17 associated with the guest in the amusement park application. As previously mentioned, the user ID 17 may include age, height, family members and respective age and height, languages spoken, preferred language, special assistance preference, and so forth. The processor 72 may send (process block 136) one or more questions (e.g., as sub-questions 18) to the guest for the selected time slot to attend the point of interest 12. For example, for the parade, the processor 72 may request information related to the number of adults, children, or both, that will be on the same float. The processor 72 may receive (process block 138) answers to the one or more questions from the amusement park application 10 based on guest input to the questions. For example, the guest may answer questions to indicate that the party includes the guest (e.g., an adult) and three children.

Based on the information provided by the guest, the processor 72 may retrieve and send (process block 140) one or more waivers to the guest based on the received answers. For example, the processor 72 may retrieve and transmit a particular number of waivers for both adults and children if the guest answered that the party includes the particular number of adults and children. In some embodiments, the point of interest 12 may request completion of a particular waiver 20 for each guest and as such, some waivers 20 may always be transmitted to the guest. The processor 72 may receive (process block 142) completed waivers 20. After the guest and/or the party completes the waivers 20, such as by signing the waiver (e.g., using a finger or a stylus pen in the amusement park application 10) and submits the waiver 20, the processor 72 may receive the submitted waiver 20 to confirm compliance with procedures for completing the waiver 20 for the point of interest 12.

After receiving the completed waiver, the processor 72 may determine whether (decision block 144) the waivers are in compliance to attend the point of interest. In some embodiments, compliance may be based on one or more factors, such as the point of interest 12, the particular guest, legibility, and so forth. By way of example, compliance for the point of interest may relate to a minimum weight and/or age to be on the float. If the completed waiver 20 is in compliance, the processor 72 may approve the guest and send (process block 145) a message indicating successful approval of the request to attend the point of interest 12. The check-in system 50 may also check-in the guest at the point of interest 12 (e.g., preapprove the guest for attendance). Moreover, the check-in system may reserve the requested time and date for the guest to attend the point of interest 12. In some embodiments, and as previously discussed, the message of approval may include a QR code or another unique identifier. In some instances, the unique identifier may be secure, such that the identifier is not easily copied or susceptible to fraud (e.g., used by another guest). On the other hand, if the processor 72 is not in compliance, the processor 72 may disapprove (process block 146) the guest. As such, the guest may not be able to attend the point of interest 12. As previously mentioned, the processor may send a request to the guest (e.g., via the amusement park application 10) to revise the waivers 20 within a predetermined time period (e.g., holding the reservation) so that the guest may be approved to attend the point of interest 12. In some embodiments, the processor 72 may request payment in the amusement park application 10. For example, some point of interests 12 may request payment for reservations (e.g., a holiday show, restaurant reservation, and so forth). In such instances, if the precheck documents associated with the reservation are improperly completed, the processor 72 may refund the payment. In this manner, the check-in system 50 may validate and check in the guest prior to the guest arriving at the point of interest 12 (e.g., amusement park experience) for an efficient park experience.

Specifically, some of the benefits and efficiencies provided by the check-in system 50 include improving computer operations. Improving computer operations may include a check-in process that reduces the numerous and often extraneous documents reviewed when validating a guest. Rather than processing multiple redundant documents for each guest, which may be time consuming and use a relatively large amount of processing power, the check-in-system 50 described herein utilizes data to provide appropriate documents tailored to the guest for computer processing in checking in the guest. Moreover, computer processing of the documents may be performed at a single location (e.g., at a back end or non- guest interface), expediting otherwise time consuming and power consuming processes otherwise associated with multiple check-in processes at various locations (e.g., in a park application, at an entrance of the point of interest, in a line at the point of interest, and so forth).

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f).

However, for any claims containing elements designated in any other manner, it is intended that such elements are not to be interpreted under 35 U.S.C. 112(f).

The invention claimed is:

1. A check-in system, comprising:
an amusement park attraction associated with a check-in process;
one or more sensors configured to provide data indicative of availability of the amusement park attraction; and
a controller configured to:
   determine that the amusement park attraction is available at one or more times based on the data;
   receive a request from a guest to attend the amusement park attraction for at least one of the one or more times;
   access guest data associated with the guest from one or more third party applications;
   populate at least a portion of one or more forms, one or more waivers, or a combination thereof, based on the guest data accessed from the one or more third party applications;
   in response to the request, send the one or more forms, the one or more waivers, or the combination thereof, to the guest;
   receive the one or more forms, the one or more waivers, or the combination thereof, after completion; and
   verify the one or more forms, the one or more waivers, or the combination thereof, to be in compliance for the amusement park attraction; and
   in response to determining the compliance, send an entrance code to the guest, the entrance code indicating a verified status.

2. The check-in system of claim 1, wherein the controller is configured to check in the guest at the amusement park attraction using the entrance code without a verification process at the amusement park attraction.

3. The check-in system of claim 1, wherein the entrance code comprises a quick response (QR) code.

4. The check-in system of claim 1, wherein the controller is configured to:
identify the guest based on a radio frequency identification tag;
retrieve information associated with the guest; and
send the one or more forms, the one or more waivers, or the combination thereof, based at least in part on the information.

5. The check-in system of claim 4, wherein the controller is configured to populate at least a portion of the one or more forms, the one or more waivers, or the combination thereof, based on the information.

6. The check-in system of claim 1, wherein the controller is configured to determine that the amusement park attraction is available at the one or more times based on the data and pending reservations for the amusement park attraction.

7. The check-in system of claim 1, wherein the controller is configured to:
determine a presence of a guest proximate to the amusement park attraction based on the data, additional data provided by one or more additional sensors, or both; and
in response to determining the presence of the guest proximate to the amusement park attraction, generate a recommendation for the guest to make a reservation to the amusement park attraction.

8. The check-in system of claim 1, wherein the controller is configured to:
populate at least a portion of the one or more waivers based on the guest data.

9. A method of operating a check-in system, the method comprising:
determining, by a controller and based on data received from one or more sensors, a presence of a guest proximate to an amusement park attraction;
in response to determining the presence of the guest proximate to the amusement park attraction, providing, by the controller, a recommendation to the guest to make a reservation to the amusement park attraction;
receiving, by the controller, a request from the guest to reserve a feature of the amusement park attraction;
accessing, by the controller, guest data associated with the guest from one or more third party applications;
automatically populating, by the controller, at least a portion of one or more documents based on the guest data accessed from the one or more third party applications;
determining, by the controller, availability of the feature;
in response to determining that the feature is available, sending, by the controller, the one or more documents to be completed by the guest;
receiving, by the controller, the one or more documents after completion of the one or more documents;
validating, by the controller, the one or more documents after the completion of the one or more documents;
providing, by the controller, a code indicating a validated status of the one or more documents in response to the validating of the one or more documents after the completion of the one or more documents; and
reserving, by the controller, the feature of the amusement park attraction in response to the validating of the one or more documents after the completion of the one or more documents.

10. The method of claim 9, wherein the request comprises an indication of a number of people to attend the feature.

11. The method of claim 10, wherein determining the availability of the feature comprises determining present reservations, future availability of the feature, and a current status defined by at least one additional sensor of the feature.

12. The method of claim 10, wherein the one or more documents are based at least in part on the number of people.

13. The method of claim 9, wherein the request indicates a number of adults, a number of children, or a combination thereof.

14. The method of claim 9, wherein the request comprises an indication of a special assistance request to attend the feature.

15. The method of claim 14, wherein the one or more documents are based at least in part on the special assistance request.

16. The method of claim 9, wherein the one or more documents comprise a waiver, and wherein the method comprises:
populating, by the controller, at least a portion of the waiver based on the guest data.

17. A method of operating a check-in system, the method comprising:
sending, via an amusement park application, a request for one or more guests to reserve a feature of an amusement park attraction;
receiving, via the amusement park application, a request to complete a waiver for each guest of the one or more guests prior to the one or more guests attending the amusement park attraction;

accessing, via the amusement park application and from one or more third party applications, guest data associated with the one or more guests;

populating, via the amusement park application, at least a portion of the waiver based on the guest data accessed from the one or more third party applications;

sending, via the amusement park application, the waiver upon the completion of the waiver; and receiving, via the amusement park application, a message for each guest of the one or more guests to enter the amusement park attraction without a verification process at the amusement park attraction.

18. The method of claim 17, comprising:

receiving, via the amusement park application, an additional request to provide payment for the amusement park attraction prior to attending the amusement park attraction.

19. The method of claim 17, wherein the message comprises a unique code associated with a reservation of the feature.

20. The method of claim 17, comprising:

determining, based on data received from one or more sensors, a presence of the one or more guests proximate to an amusement park attraction; and in response to determining the presence of the one or more guests proximate to the amusement park attraction, displaying, via the amusement park application, a prompt comprising a suggestion to visit the amusement park attraction.

* * * * *